United States Patent [19]

Zengel et al.

[11] 4,289,869

[45] Sep. 15, 1981

[54] MIXTURE HARDENING UNDER THE INFLUENCE OF AIR MOISTURE AND A PROCESS FOR PRODUCTION OF POLYISOCYANATE-POLY-ADDITION PRODUCTS OR OF CROSS-LINKED POLYEPOXIDES

[75] Inventors: Hans-Georg Zengel, Kleinwallstadt; Michael Wallrabenstein, Wörth; Walter Brodowski, Amorbach, all of Fed. Rep. of Germany

[73] Assignee: Akzo NV, Arnhem, Netherlands

[21] Appl. No.: 152,368

[22] Filed: May 22, 1980

[30] Foreign Application Priority Data

May 31, 1979 [DE] Fed. Rep. of Germany ....... 2922176

[51] Int. Cl.$^3$ ..................... C08G 18/32; C08G 59/18; C08G 59/50
[52] U.S. Cl. ..................................... 528/73; 528/405; 528/406; 544/242; 544/295; 548/335; 548/336; 548/341; 548/346; 528/117; 528/118
[58] Field of Search ................... 521/128, 129; 528/73, 528/404, 405

[56] References Cited

U.S. PATENT DOCUMENTS

| | | | |
|---|---|---|---|
| 3,787,416 | 1/1974 | Cyba ..................................... | 422/41 |
| 3,912,691 | 10/1975 | Emmons ............................... | 528/73 |
| 3,941,753 | 3/1976 | Binkmann et al. ..................... | 528/73 |
| 4,024,117 | 5/1977 | Emmons ............................... | 528/73 |
| 4,174,337 | 11/1979 | Birkmayer et al. .................... | 528/73 |
| 4,221,891 | 9/1980 | Erikson et al. ........................ | 528/73 |
| 4,228,294 | 10/1980 | Lawarchik ............................ | 528/73 |

FOREIGN PATENT DOCUMENTS

| | | |
|---|---|---|
| 2044719 | 4/1971 | Fed. Rep. of Germany . |
| 2018233 | 8/1971 | Fed. Rep. of Germany . |
| 2718100 | 10/1978 | Fed. Rep. of Germany . |
| 2739313 | 3/1979 | Fed. Rep. of Germany . |

Primary Examiner—H. S. Cockeram
Attorney, Agent, or Firm—Michael J. Striker

[57] ABSTRACT

Mixtures hardenable under the influence of air moisture are provided. They comprise at least one organic polyisocyanate or an polyepoxide and as a moisture activated hardener an N,N'-substituted imidazolidine derivative or an N,N'-substituted hexahydropyrimidine derivative, which show at no nitrogen atom a —CO—NH— grouping and which are present in sufficient amount to provide for cross-linking. The mixtures for example provide lacquers and adhesives having various touch dry times.

14 Claims, No Drawings

MIXTURE HARDENING UNDER THE INFLUENCE OF AIR MOISTURE AND A PROCESS FOR PRODUCTION OF POLYISOCYANATE-POLY-ADDITION PRODUCTS OR OF CROSS-LINKED POLYEPOXIDES

The invention relates to a mixture hardening under the influence of air moisture and to a process for production of polyisocyanate-polyaddition products or cross-linked polyepoxides.

According to German Offenlegungsschrift DE-OS No. 2 018 233 preparations are known which comprise an oxazolidine and a polyfunctional isocyanate and which harden in the presence of water to provide tough, chemically resistant polymeric materials.

In the German Offenlegungsschrift DE-OS No. 2 718 100 a process is described for preparing polyisocyanatepolyaddition products by reacting of organic polyisocyanates with compounds which split off organic diamines under the influence of water. Herein polycyclic condensation products of formaldehyde with aliphatic or cycloaliphatic diprimary 1,2-diamines are employed as compounds splitting off organic diamines.

In the German Offenlegungsschrift DT-OS No. 2 739 313 moisture hardeners for plastics precursors are proposed comprising N,N'-substituted imidazolidine-derivatives or hexahydropyrimidine derivatives, which are synthesized by a several hour reaction of defined cycloaminales (N,N-diamine-acetales) having in each case at an N-atom a hydrogen atom with a polyisocyanate in an equivalent ratio of 1:1. The employment of such compounds for the purpose named thus requires not only an additional synthesis step, but also a double amount of polyisocyanates, since in the synthesis of these compounds practically an equal amount of polyisocyanate is used as is in the later application of the compounds as moisture hardeners.

It is known from the U.S. Pat. No. 3,787,416 to employ N-hydroxyalkyl-N'-hydrocarbylhexahydropyrimidine or N-alkoxyalkyl-N'-hydrocarbyl-hexahydropyrimidine, wherein the hydrocarbyl group is a secondary alkyl or a cycloalkyl, as hardening catalysts in the production of polyurethane and epoxy resins. These compounds are employed in the usual minimal amounts of 0.1 to 1% with respect to the reaction mixture. Such catalytic weight amounts are unsuitable to provide with polyepoxides or polyisocyanates mixtures hardening under the influence of air moisture.

The present invention relates to a process for production of polyisocyanate or polyepoxy-polyaddition products, respectively, in the presence of water by reacting organic polyisocyanates or polyepoxides with certain moisture activated hardeners described in more detail below. It relates also to the reaction mixtures suitable for the performance of the invention process. The mixtures comprise besides the cited polyisocyanates or polyepoxides and usual additives defined moisture activated hardeners.

It has been found that mixtures comprising at least one organic polyisocyanate or one polyepoxide and as a moisture activated hardener an N,N'-substituted imidazolidine derivative or an N,N'-substituted hexahydropyrimidine harden in the presence of moisture and provide tough, versatile, polymeric materials. The compounds considered comprise at no N-atom a —CO—NH— grouping and are employed in amounts assuring chemical hardening and the amounts are considerably higher than required in the catalytic application of these compounds as synthesizing catalysts (compare for example German Offenlegungsschrift DT-OS No. 2 044 719). Many of these mixtures can be stored in the absence of moisture without appreciable reaction between the hardeners employed according to the invention and the polyisocyanate or polyepoxide to be hardened.

A multitude of N,N'-substituted imidazolidine derivatives and N,N'-substituted hexahydropyrimidine derivatives can be employed for the mixture in accordance with the present invention. The derivatives considered can be of low molecular weight or they can have a higher molecular weight. The moisture activated hardeners may comprise at most one active hydrogen atom. Active hydrogen atoms comprise the hydrogen atoms of primary and secondary amino groups, carboxyl- and hydroxyl groups, which react with isocyanates. Such moisture activated hardeners having one or no active hydrogen atom effect in general a higher stability or a longer storage time for the material mixtures considered. In general, and for economic reasons, the substituents of the low molecular weight moisture hardeners shall not surpass a certain number of carbon atoms. For controlling reaction speed, it may be advantageous in cases to employ mixtures of N,N'-substituted imidazolidine derivatives and/or N,N'-substituted hexahydropyrimidine derivatives.

A preferred group of the mixtures according to the present invention is characterized in that they comprise as an N,N'-substituted imidazolidine derivative an imidazolidine of the general formula

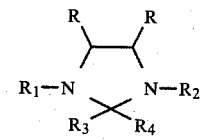

wherein $R_1$ is a hydrogen atom, a hydroxyalkyl or an alkyl group with from 1 to 12 carbon atoms, $R_2$ is an alkyl group with 1 to 12 carbon atoms or $R_1$ and $R_2$ are

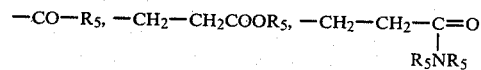

wherein $R_5$ is an alkyl group with up to 8 carbon atoms, and —CH$_2$—CH$_2$—CN, $R_3$ is a hydrogen atom or an alkyl group with 1 to 5 carbon atoms or $R_3$ and $R_4$ are a single alkylene group with 4 to 6 carbon atoms and R is a hydrogen atom or an alkyl group with 1 to 4 carbon atoms. These compounds can be prepared for example by cyclization of secondary ethylene diamines with the corresponding carbonyl compounds that is aldehydes and ketones of given constitution such as formaldehyde or cyclohexanone.

By way of example the following such imidazolidines are listed: 2-penta-methylene-N,N'-dimethylimidazolidine-1,3, N,N'-dimethylimidazolidine; N,N'-di-n-butylimidazolidine; N,N'-dicyclohexylimidazolidine, N,N'-di-i-propylimidazolidine; N,N'-bis-dodecylimidazolidine.

A further preferred group of the imidazolidine derivatives in accordance with the invention is characterized in that in the above formula picture $R_1$ and $R_2$ represent

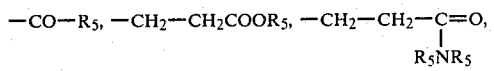

wherein $R_5$ is an aldehyde group with up to eight carbon atoms, and $-CH_2-CH_2-CN$. Herein $R_1$ can also be a hydrogen atom, a hydroxyalkyl group or an alkyl group with 1 to 12 carbon atoms.

As examples of such imidazolidines are listed: N,N'-diethyl-β-dicarbethoxyimidazolidine-1,3, N,N'-diacetyl-imidazolidine, N,N'-diethyl-β-dicyanoimidazolidine, 2-pentamethylene-N,N'-diethyl-β-dicyano-imidazolidine, N-β-hydroxyethyl-N'-β-cyanoethylimidazolidine; N,N'-diethyl-β-dicyano-5-Methylimidazolidine.

N,N'-diacylimidazolidines can be prepared according to Mod, Magne and Sumrell, J. Am. Oil Chem. Soc. 48(1971), 254. The preparation of the other cited imidazolidine derivatives can be performed for example by addition of the corresponding imidazolidines having secondary N-atoms to the compounds given in their constitution with activated C=C double bonds. Further, it is possible to add ethylene diamine to a corresponding compound with activated C=C double bonds such as acrylonitrile, acrylamide, acrylic acid ester for then to perform a cyclization of the reaction product with the corresponding carbonyl compound.

Also oligomers can be prepared with imidazolidine and hexahydropyrimidine groupings. For this all bisacryl compounds are suitable, which have two activated double bonds and which therefor can add the corresponding diamines. For example one can add the primary diamines ethylene diamine and propylenediamine to alkanedioldiacrylates and then one can cyclize the obtained reaction products by reaction with aldehydes and ketones. Preferred mixtures of this kind in accordance with the invention are characterized in that they contain imidazolidine oligomers or hexahydropyrimidine oligomers with a molecular weight of about 400 to 1500, which have been obtained by addition of primary diamines with 2 to 3 carbon atoms to alkanoldiacrylates followed by cyclization with aldehydes and ketones of from 1 to 9 carbon atoms. Such oligomers are obtained for example by adding ethylenediamine or propylene diamine to butanedioldiacrylate followed by cyclization with carbonyl compounds such as formaldehyde.

Further preferred mixtures in accordance with the invention are characterized in that they contain a substituted hexahydropyrimidine derivative of the general formula

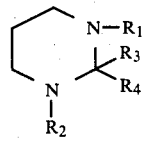

wherein $R_1$ is a hydrogen atom, a hydroxyalkyl group or an alkyl group with 1 to 12 carbon atoms, $R_2$ is an alkyl group with 1 to 12 carbon atoms or $R_1$ and $R_2$ are

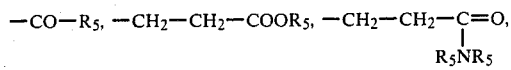

wherein $R_5$ is an alkyl group with up to eight carbon atoms, and $-CH_2-CH_2-CN$, $R_3$ is a hydrogen atom or an alkyl group with 1 to 5 carbon atoms or $R_3$ and $R_4$ are a single alkylene group with from 4 to 6 carbon atoms. As examples of such hexahydropyrimidine derivatives are cited: 2-pentamethylene-N,N'-dimethyl-hexahydropyrimidine, N,N'-dibutyl-hexahydropyrimidine, N,N'-dibenzyl-hexahydropyrimidine, N,N'-bisdodecyl-hexahydropyrimidine, 2,2-dimethyl-N,N'-dibutyl-hexahydropyrimidine.

They can be prepared similarly as in the case of the preparation of the above imidazolidine derivatives for example by cyclization of secondary propylene diamines with corresponding carbonyl compounds with given constitution.

Furthermore, in accordance with the invention such hexahydropyrimidine derivatives are very suitable, for which in the above formula picture $R_1$ and $R_2$ represent

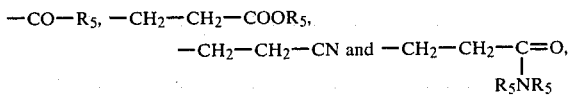

wherein $R_5$ is an alkyl group with up to eight carbon atoms. Furthermore, $R_1$ can be a hydrogen atom, a hydroxylalkyl or an alkyl group with 1 to 12 carbon atoms. As examples for such hexahydropyrimidines are cited:

N,N'-diacetylhexahydropyrimidine, N,N'-di-β-cyanoethylhexahydropyrimidine, N,N'-di-β-carbethoxyethyl-hexahydropyrimidine, N,N'-bis(propionic acid diethylamido)hexahydropyrimidine. N,N'-diacetylhexahydropyrimidine can be prepared according to Mod, Magne and Sumrell, J. Am. Oil Chem. Soc. 48 (1971), 254. The preparation of the other cited hexahydropyrimidine derivatives for example can be performed in analogy to the preparation of the above imidazolidine derivatives by addition of the corresponding hexahydropyrimidines having secondary N-atoms to compounds with activated C=C double bonds of given constitution. Furthermore it is possible to add propylenediamine to a corresponding compound with activated C=C double bonds such as acrylonitrile, acrylamide and acrylester and then to perform a cyclization of the reaction product with the corresponding carbonyl compound of given constitution.

A large number of polyfunctional isocyanates, that is isocyanates having at least two —NCO— groups, can be employed for the mixtures in accordance with the invention. Practically, any isocyanante with two or more —NCO groups can be employed and the —NCO groups react in the presence of moisture with the N,N'-substituted imidazolidine derivatives or hexahydropyrimidine derivatives according to the present invention. Herein included are also the usual and known NCO-prepolymers with a molecular weight of about 500 to 10,000, preferably from 2,000 to 5,000.

Among the polyisocyanates employable in the mixtures of the invention are for example the aliphatic isocyanates such as 1,6-hexamethylenediisocyanate, 1,8-octamethylenediisocyanate, 1,12-dodecamethylenediisocyanate, 2,24-trimethylhexamethylenediisocyanante and similar alkylene diisocyanates, 3,3'-diisocyana tedipropylether, 3-isocyanatemethyl-3,5,5-trimethylcyclohexylisocyanate, cyclopentylene-1,3-diisocyanate, cyclohexylene-1,4-diisocyanate, methyl-2,6-diisocyanatecaproate and related isocyanates, bis-(2-isocyanate-ethyl)-fumarate, 4-methyl-1,3-diisocyanatecyclohexane, trans-vinylenediisocyanate and similar unsaturated isocyanates, 4,4'-methylene-bis(isocyanatecyclohexane) and related isocyanates, menthanediisocyanate, N,N',N''-tris(6-isocyanatehexamethylene)-biuret and related isocyanates, bis-(2-isocyanate-ethyl)-carbonate and related carbonatediisocyanates as well as other known isocyanates derived from aliphatic polyamines, aromatic isocyanates such as for example toluylenediisocyanate, xylylenediisocyanate, dianisidiindiisocyanate, 4,4'-diphenylmethanediisocyanate, 1-ethoxy-2,4-diisocyanatebenzene, 1-chloro-2,4-diisocyanatebenzene, tris-(4-isocyanatephenyl)-methane, naphthalidenediisocyanate, fluorenediisocyanate, 4,4'-biphenyldiisocyanate, phenylenediisocyanate, 3,3'-dimethyl-4,4'-biphenyldiisocyanate, p-isocyanatebenzylisocyanate, tetrachloro-1,3-phenylenediisocyanate and related isocyanates,2,4,6-tribromo-1,3-phenylenediisocyanate, bis-(2-isocyanateethyl)-benzene, vinylpolymers, which for example contain isocyanate-ethylmethacrylate or acrylate as monomer or comonomer, prepolymers of polyisocyanates with polyhydroxyl or polyamine compounds such as for example the prepolymers of 3-isocyanatemethyl-3,3,5-trimethylcyclohexylisocyanate, toluylenediisocyanate, methanediisocyanate, 4,4'-methylene-bis-(cyclohexylisocyanate), 4,4'-methylene-bis-(isocyanatecyclohexane), 2-isocyanateethyl-6-isocyanatecaproate and the like with polyetherpolyols, polyesterpolyols and the like.

As polyepoxides employable in the mixtures of the invention are suitable in principle all polyepoxides, which can be hardened with amines. Examples for these are in particular the glycidylethers of bisphenol A, phenylglycidylether derivatives, tetrahydro and hexahydro phthalic acid diglycidylesters.

The mixtures according to the invention are in the absence of moisture nonreactive and relatively stable. However, when the mixtures contact moisture they harden to tough, solid polymeric materials. It is an advantage of the mixtures that the reaction does not occur so rapidly as to require processing in too short a time.

The reaction between the hardeners employed in accordance with the invention and the polyisocyanate or polyepoxide component, respectively, is effected in general by atmospheric moisture. If desired, water can be added to the mixtures for hardening. Although the hydrolysis of the hardeners, which effects the splitting off of the reactive secondary diamines, and the then following polyaddition occurs at room temperature, higher temperatures can favor reaction and hardening. In general, for this temperatures up to 60° C. are completely sufficient.

Thus the present invention relates also to a process for the manufacture of polyisocyanate-polyaddition products or of cross-linked epoxy resins in the presence of water by reacting organic polyisocyanates or polyepoxides with compounds, which under the hydrolyzing influence of water split off organic diamines, which is characterized in that as compounds, which under the influence of water split off organic secondary diamines, are employed the imidazolidine or hexahydropyrimidine derivatives defined in claims 1 to 7.

In accordance with the mixtures or the process, respectively, of the present invention lacquers, seamless floor coverings, gap filling compositions, seals, adhesives for natural and synthetic materials and the like can be prepared. The mixtures according to the invention can be employed with a solvent. Suitable as solvents are in particular aromatic solvents as toluene, xylene, ester such as ethyl glycol acetate, butylacetate and ketones such as methylethylketone, methylisobutylketone.

The ratio of the mole equivalents of isocyanate to the hardeners employed according to the invention can vary over a wide range and thereby it is possible to influence the kind and properties of the resulting materials. In general the ratio of the mole equivalents of isocyanate to the hardener in mixtures according to the invention is from 1:10 to 10:1 and preferably 1:1.1 to about 2.5:1. The ratio of the mole equivalents of the glycidyl groups to the hardeners employed according to the invention can be from about 1:10 to 10:1 and is preferably from 1:1 to about 2:1. The hardening reaction runs advantageously with the addition of usual catalysts, for example phenol.

Of course, the mixtures in accordance with the invention can comprise the usually employed auxiliary materials and additives. As such can be considered for example pigments, antisettling materials, leveling agents and fillers such as barium sulfate, chalk powder, talcum.

EXAMPLE 1

Preparation of 2-pentamethylene-N,N'-dimethylimidazolidine-1,3 by cyclization of N,N'-dimethylethylenediamine with cyclohexanone.

In a two necked flask provided with stirrer, head for water separation with reflux condenser and dry tube 400 ml benzene, 83 g (0.94 mole) N,N'-dimethylethylenediamine and 92.4 g (0.94 mole) cyclohexanone are filled in. The reaction mixture is heated under reflux and the water distills off as an azeotrope and is collected in the water separator after separation from benzene and is drained off. The water separation was finished after three hours. The benzene was distilled off from the flask and then the reaction product was obtained pure by twice fractional distilling in vacuum. Boiling point: 333° K./399 Pa. The yield of 2-pentamethylene-N,N'-dimethylimidazolidine-1,3 was about 50%.

Elementary analysis calculated for C10 H 20 N 2: C 71.5; H 11.9; N 16.6. C 70.4; H12.0; N 17.0.

EXAMPLE 2

Preparation of N,N'-diethyl-β-dicarbethoxy-imidazolidine-1,3 by addition of ethylenediamine to acrylic acid ethylester followed by cyclization with paraformaldehyde.

33.5 ml (0.5 mole) ethylenediamine and 200 ml toluene were filled in a three necked flask with stirrer, dropping funnel, head for water separation and reflux condenser with dry tube. The solution was cooled to 273° K., then 108 ml (1 mole) acrylic acid ethylester was slowly added at 273° to 278° K. The cooling was now interrupted and the temperature of the contents of the flask increased after about an hour to room temperature. At room temperature there was stirring for three hours, then 15 g (0.5 mole) paraformaldehyde were added and the reaction mixture was heated under reflux.

In about 1.5 to 2 hours the calculated amount of water was separated by azeotropic distillation. Initially, the reaction solution was freed from toluene in a rotating evaporator. After purification in high vacuum the yield amounts to about 90%. Then a two time fractional distillation of the reaction product followed in high vacuum.

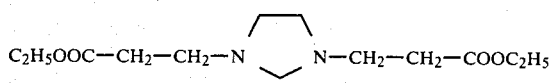

$C_2H_5OOC-CH_2-CH_2-N\phantom{xx}N-CH_2-CH_2-COOC_2H_5$

N,N'-diethyl-$\beta$-dicarbethoxy-imidazolidine-1,3 boiled at 403° K./13 Pa. The yield was 60%.

Elementary analysis for C 13 H 24 N 28: Calculated: C 57.4; H 8.8; N 10.3. Found: C 56.9; H 9.2; N 11.0.

EXAMPLE 3

Preparation of 2-pentamethylene-N,N'-diethyl-$\beta$-carbethoxyimidazolidine by addition of 2-pentamethylene-1,3-imidazolidine to acrylic acid ethylester.

200 ml waterfree methanol, 100 g (1 mole) acrylic acid ethylester stabilized by 100 ppm hydroquinone and 30 g (0.5 mole) 2-pentamethylene-1,3-imidazolidine were placed in a two necked flask with stirrer and condenser with dry tube. The reaction solution is stirred at room temperature for 48 hours. Then the methanol and the remainders of the unreacted starting material are distilled under high vacuum in a rotary evaporator. The yeild of the 2-pentamethylene-N,N'-diethyl-$\beta$-carbethoxyimidazolidine amounted to 93%.

Elementary analysis for C 18 H 24 N 2: Calculated: C 63.5; H 9.4; N 8.2. Found: C 63.9; H 9.8; N 8.8.

EXAMPLES 4, 5 and 6

Preparation of N,N'-diethyl-$\beta$-dicyano-imidazolidine and N,N'-diethyl-$\beta$-dicyano-hexahydropyrimidine by addition of ethylene diamine or 1,3-diaminopropane, respectively, to acrylonitrile followed by cyclization with paraformaldehyde.

Hydroquinone stabilized acrylonitrile was dropped to a solution of 60.1 g (1 mole) ethylenediamine in 300 ml methanol in a nitrogen atmosphere at 273° to 278° K. The cooling was removed and the contents of the flask was stirred at room temperature over night. After distilling off of the methanol 500 ml toluene and 15.85 g paraformaldehyde were added to the addition product and it was heated under reflux. The wate released by cyclization was thereby azeotropically removed. N,N'-diethyl-$\beta$-dicyanoimidazolidine was obtained in a 92% yield after evaporation of the solvent in high vacuum.

Elementary analysis for $C_9H_{14}N_4$: Calculated: C 61.1; H 7.9; N 31.4. Found: C 61.1; H 8.1; N 31.7.

Employing 1,3-diaminopropane instead of ethylenediamine according to this process N,N'-diethyl-$\beta$-dicyanohexahydropyrimidine was obtained in more than 90% yield.

Employing 1,2-diaminopropane instead of ethylenediamine according to the above process N,N'-diethyl-$\beta$-dicyano-5-methylimidazolidine was obtained. The yield was 90%.

EXAMPLE 7

Preparation of N,N'-dibenzyl-hexahydropyrimidine

N,N'-dibenzylaminopropane was prepared by reacting of one mole of dibromopropane with 5 mole benzylamine (in analogy to Hofmann, J. pr. Chem. 1859, 388). Boiling point 180°–185° C./0.02 mm.

0.1 mole N,N'-dibenzylaminopropane were reacted with a 10% molar excess of paraformaldehyde in 150 ml toluene under boiling with reflux in a flask provided with a water separator and a reflux condenser.

The water released in the cyclization reaction was removed azeotropically from the flask and collected in the water separator. 93% of theory of the water were split off after 5 hours. After distilling off of the toluene the material was freed from further traces of the solvent and of the starting compound under high vacuum.

Yield: 85%.

Elementary analysis for $C_{18}H_{22}N_2$: Calculated: C 81.2; H 8.3; N 10.5. Found: C 81.0; H 8.3; N 11.2.

EXAMPLE 8

Preparation of N,N'-dibutyl-hexahydropyrimidine.

It was performed in full analogy to Example 7 from 1,3-dibromopropane and butylamine followed by cyclization with paraformaldehyde.

EXAMPLE 9

Preparation of N,N'-bis(propionic acid diethylamido)imidazolidine by addition of ethylenediamine to acrylic acid diethylamide followed by cyclization with formaldehyde.

In analogy to H. R. Snyder and R. E. Putnam, J. Am. Chem. Soc. Vol 76 (1954) 34 acrylic acid diethylamide was prepared from diethylamine and acrylic acid chloride in benzene. Boiling point 96° C./10 mm.

2.6 g (43.3 millimole) ethylenediamine dissolved in 100 ml toluene were placed in a 250 ml three necked flask with dropping funnel, stirrer and thermometer and cooled to 0° C. To this 11 g (86.6 millimole) acrylic acid diethylamide dissolved in 50 ml toluene were slowly added drop by drop. After an hour the cooling was removed and the stirring continued at room temperature over night. After a stirring time of 16 hours 1.36 g paraformaldehyde were added to the mixture and the compound was cyclized by boiling under reflux. The split off water was azeotropically removed from the reaction vessel. After termination of the cyclization the toluene was distilled off and the yellow liquid residue was purified in high vacuum.

Yield: about 40%.

Elementary analysis for $C_{17}H_{34}N_4O_2$: Calculated: C 62.8; H 10.43; N 17.18. Found: C 62.2; H 10.6; N 18.0.

EXAMPLE 10

Preparation of 1-$\beta$-hydroxyethyl-3-$\beta$-cyanoethyl-imidazolidine 104.2 g (1 mole) aminoethylethanolamine and 30 g paraformaldehyde were dissolved in 300 ml toluene in a two-necked flask with stirrer, water separator and reflux condenser and boiled under reflux. After 3 hours the calculated amounts of water were removed. The toluene was removed by distillation and the N-hydroxyethyl-imidazolidine was distilled in vacuo. Boiling point 70° C./0.1 mm.

Yield: about 80%.

0.5 mole N-hydroxyethyl-imidazolidine were cooled to 0°–3° C. and 0.5 mole acrylonitrile was added drop by drop. After termination of the adding the cooling was switched off and the contents of the flask was stirred for 20 hours at room temperature. The resulting compound 1-β-hydroxyethyl-3-β-cyanoethylimidazolidine was freed from impurities in high vacuo.

Yield: 90% of theory.

Elementary analysis for:

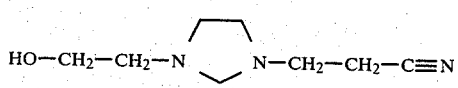

Calculated: C 56.80; H 8.88; N 24.85. Found: C 57.0; H 9.2; N 25.7.

The infrared spectra obtained showed at 3,200–3,600 cm$^{-1}$ the absorption of the OH-group and at 2,200 cm$^{-1}$ the C≡N absorption band.

EXAMPLE 11

Preparation of N,N'-bisdodecylimidazolidine 1.5 mole of dodecyl amine were molten and at 30° C. 0.17 mole of 1,2-dibromoethane were added drop by drop. After subsiding of the exothermic reaction the solution was heated for another 4 hours to 80° C. The solidified product was placed in water and shaken out with ether. The product was purified in high vacuo.

Yield: 92.6%

Elementary analysis for

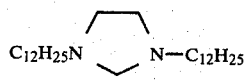

Calculated: C 77.33; H 13.81; N 6.85. Found: C 79.4; H 13.9; N 7.0.

EXAMPLE 12

The preparation of N,N'-bisdodecyl-hexahydropyrimidine was performed in analogy to Example 11, but instead of 1,2-dibromoethane 1,3-dibromopropane was employed.

The yield of N,N'-bis(dodecyl)-1,3-diaminopropane was increased to 61% by salting out of the ether with rocksalt. The yield of N,N'-bisdodecyl-hexahydropyrimidine amounted to 95%.

Elementary analysis for

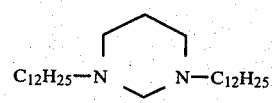

Calculated: C 79.52; H, 13.85; N 6.63. Found: C 79.8; H 13.7; N 6.7.

EXAMPLE 13

Preparation of 2,2-dimethyl-N,N'-dibutylhexahydropyrimidine 0.1 mole N,N'-dibutyldiaminopropane and 0.2 mole waterfree acetone as well as 20 g molecular sieves with 5 Å were placed in an Erlenmeyer flask and the mixture was stirred for 48 hours at room temperature with a magnetic stirrer. In absence of moisture the molecular sieves were separated and the excess acetone was distilled off. The product was then purified by two time fractional distillation in vacuo. Yield: about 40%, boiling point 82°–84° C. at 0.3 mm.

Elementary analysis for

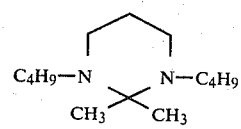

Calculated: C 74.25; H 13.38; N 12.37. Found: C 73.8; H 13.1; N 12.8.

EXAMPLE 14

Hardening of polyisocyanates (Desmodur N) with imidazolidine and hexahydropyrimidine derivatives The viscous-liquid imidazolidine and hexahydropyrimidine derivatives prepared in Examples 1 to 13 were thinned with 20% waterfree methylisobutylketone. The solutions were mixed with equivalent amounts of a 75% Desmodur N-solution in xylene/ethylglycolacetate 1:1 of the firm Bayer AG and stirred for 10 minutes with a magnetic stirrer. The resulting solutions were spread on a cleaned and deoiled black iron plate with a charging spiral or a coating roller system to a layer thickness of about 100 micron. Beginning with the coating of the lacquer the drying time was determined within which the resulting lacquer turned touch dry (touch dry time). Touch dry times for imidazolidine derivatives at room temperature.

| Imidanzolidine and Hexahydropyrimidine derivatives | touch dry after |
|---|---|
| 2-pentamethylene-N,N'-dimethyl-imidazolidine | 2 to 3 min. |
| N,N'-diethyl-β-dicarbethoxyimidazolidine-1,3 | 15 min. |
| 2-pentamethylene-N,N'-diethyl-β-di-carbethoxy-imidazolidine-1,3 | 2 to 2½ hours |
| N,N'-diacetylimidazolidine | 17 to 18 hours |
| N,N'-diethyl-β-dicyano-imidazolidine | 4 hours |
| N,N'-diethyl-β-dicyano-hexahydropyrimidine | 4 hours |
| N,N'-diethyl-β-dicyano-5-methylimidazolidine | 5 hours |
| 2-phenyl-N,N'-diethyl-β-dicyano-hexahydropyrimidine | 7 to 8 hours |
| N,N'-dibenzylhexahydropyrimidine | 3 hours |
| N,N'-dibutyl-hexahydropyrimidine | 10 to 15 min. |
| N,N'-bis(propionic acid diethylamido)-imidazolidine | 15 to 20 min. |
| 1-β-hydroxyethyl-3-β-cyanoethyl-imidazolidine | 15 min. |
| N,N'-bisdodecylimidazolidine | 30 min. |
| N,N'-bisdodecylhexahydropyrimidine | 40 min. |
| 2,2-dimethyl-N,N'-dibutylhexahydropyrimidine | 30 min. |

EXAMPLE 15

Preparation of imidazolidine oligomers by addition of ethylene diamine to butanedioldiacrylate followed by cyclization with paraformaldehyde.

200 ml methanol and 49.5 g (250 millimole) stabilized butanedioldiacrylate were placed in a three-necked flask with dropping funnel, stirrer and condenser with bubble counter and after purging with nitrogen 10 g (167 millimole) ethylenediamine were added drop by drop. The reaction solution became slowly more viscous; therefor it was thinned with an additional 100 ml of methanol. After 24 hours the solvent was rotated off in vacuo at room temperature. The residue was dissolved in 400 ml toluene in a flask with reflux condenser and dry tube, 5 g of paraformaldehyde were added and it was heated to boiling. After about 2 hours the azeotropic removal of the water was terminated. The reaction product was freed from solvent in high vacuum.

Yield: 93%; molecular weight of the oligomer: about 700.

N-contents analytically found 6.8% (calculated: 7.6%).

EXAMPLE 16

4.44 g (6 millimole) of the imidazolidine oligomer prepared in Example 4 were dissolved in 10 ml waterfree methylethylketone in a 25 ml-Erlenmeyer flask with magnetic stirrer. 5.1 g of 75% Desmodur N (in xylene/ethylglycolacetate 1:1) were added to the solution and stirred for 10 minutes. The lacquer solution was spread onto stamped, deoiled black iron plates with a roller system and were left at room temperature. The lacquer film on the black iron plate was after 10 to 15 minutes touch dry. The standing time of the lacquer solution was more than 5 hours.

EXAMPLE 17

Preparation of imidazolidine oligomers by addition of ethylene diamine to hexanedioldiacrylate followed by cyclization with paraformaldehyde.

250 ml toluene and 6.0 g (100 millimole) ethylenediamine were placed in three-necked flask with stirrer, dropping funnel, water separator and condenser and it was cooled to 0° C. After purging with nitrogen 45.2 g (200 millimole) hexanedioldiacrylate (stabilized with hydroquinone) were added drop by drop at 0° C. After stirring for 16 hours at room temperature 3.15 g paraformaldehyde were added to the reaction mixture and it was heated to boiling. After about 2 hours the azeotropical removal of water was terminated. The reaction product was freed from solvent in high vacuo.

Yield: more than 90%, molecular weight of the oligomer: 520.

N-contents analytically determined 5.9 (calculated 5.3%).

With the above compound the hardening of Desmodur N (aliphatic polyisocyanate of Bayer AG) was performed as in Example 11. The touch dry time amounted to 10 to 15 minutes.

EXAMPLE 18

Preparation of imidazolidine-oligomers by addition of 1,3-diamino propane to neopentylglycoldiacrylate followed by cyclization with paraformaldehyde.

250 ml toluene and 7.4 g (100 millimole) 1,3-diaminopropane were placed in a three-necked flask with stirrer, dropping funnel, water separator and condenser with bubble counter and cooled to 0° C. After purging with nitrogen 31.8 g (150 millimole) neopentylglycoldiacrylate (stabilized with hydroquinone) were added drop by drop. After stirring for 16 hours at room temperature 3.15 g paraformaldehyde were added to the reaction mixture and it was heated to boiling. After about two hours the azeotropic removal of the water was terminated. The reaction product was freed in high vacuo from the solvent.

Yield: 95% molecular weight of the oligomer about 800.

N-contents analytically found 6.9% (calculated: 7.6%).

A hardening experiment of this compound and Desmodur N was performed according to Example 11. The lacquer film was touch dry after three hours.

EXAMPLE 19

Hardening of Polyepoxides with Imidazolidine and Hexahydropyrimidine derivatives The epoxy compound was mixed with stoichiometrically calculated amounts of hardener (imidazolidine or hexahydropyrimidine derivatives, respectively) under addition of waterfree toluene for 5 to 10 minutes in an Erlenmeyer flask with magnetic stirrer at room temperature. The solution was spread on glass plates with a spiral film charge apparatus for 150 microns. The lacquer films were dried in air for 60 minutes. Every 15 minutes it was tested after which time the film had become touch dry.

| Epikote-type[+] | Thinning toluene (%) | Hardener | Accellerator | Touch dry after hours at room temperature | at 60° C. |
|---|---|---|---|---|---|
| 828 | | DCI | | | 15 |
| 812 | 20 | IDBA | | | 4–4.5 |
| 812 | 22 | DIBDA | | | 6–7 |
| 828 | 30 | DIBDA | 1% phenol | | 4.5 |
| 828 | 20 | IDBA | 2% benzylalcohol | | 4 |
| 1001 | 30 | IDBA | 2% benzylalcohol | 4.5 | 1.25 |
| 1001 | 30 | IDBA | 1% glacial acidic acid | 4.25 | 1.2 |
| 1001 | 20 | DCI | 3% salicylic acid | 3.5 | 1 |
| 1001 | 10 | DCI | 1% phenol | 5.5 | 1.5 |
| 1001 | 20 | DCI | 3% benzylalcohol | 4 | 1 |

DCI: N,N'-diethylcarbethoxyimidazolidine
IDBA: Oligomer from 1 mole imidazolidine and two moles butanediolbisacrylate
DIBDA: Oligomer from 2 mole imidazolidine and 3 mole butanediolbisacrylate
[+] Epikote-types of the firm Shell

We claim:
1. A polymeric mixture hardenable in the presence of moisture comprising
at least one organic polyisocyanate or polyepoxide; and a hardener activated by moisture in an amount sufficient to induce a chemical cross-linking reaction comprising an N,N'-substituted imidazolidine derivative or an N,N'-substituted hexahydropyrimidine derivative, which do not have a —CO—NH— group at any nitrogen atom.

2. The polymeric mixture according to claim 1 wherein the N,N'-substituents of the imidazolidine derivative or of the hexahydropyrimidine derivative comprise one hydrogen atom, hydroxyalkyl with 1 to 12 carbon atoms, alkyl with 1 to 12 carbon atoms,

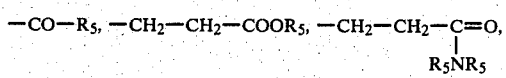

wherein $R_5$ is an alkyl group with 1 to 5 carbon atoms, and $-CH_2-CH_2-CN$.

3. The polymeric mixture according to claim 1 wherein the N,N'-substituted imidazolidine derivative or the N,N'-substituted hexahydropyrimidine derivative is a derivative wherein some or all of the hydrogen atoms linked to ring carbon atoms of the imidazolidine or hexahydropyrimidine group are substituted by an alkyl group of 1 to 5 carbon atoms or an alkylene group of 4 to 6 carbon atoms substituting two hydrogens.

4. The polymeric mixture according to claim 1 wherein the N,N'-substituted imidazolidine derivative is an imidazolidine of the general formula

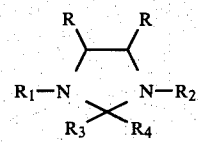

wherein $R_1$ is one hydrogen atom, a hydroxyalkyl or alkyl group with from 1 to 12 carbon atoms, $R_2$ is an alkyl group with 1 to 12 carbon atoms or $R_1$ and $R_2$ are

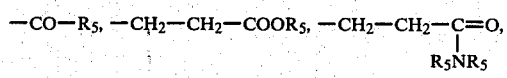

wherein $R_5$ is an alkyl group of from 1 to eight carbon atoms, and $-CH_2-CH_2-CN$, $R_3$ is a hydrogen atom or an alkyl group with from 1 to 5 carbon atoms and $R_4$ is a hydrogen atom or an alkyl group with from 1 to 5 carbon atoms or $R_3$ and $R_4$ together are a single alkylene group with from 4 to 6 carbon atoms and R is a hydrogen atom or an alkyl group with from 1 to 4 carbon atoms.

5. The polymeric mixture according to claim 4 wherein $R_1$ and $R_2$ are

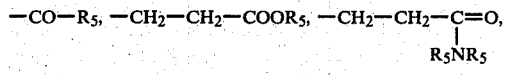

wherein $R_5$ is an alkyl group of from 1 to eight carbon atoms, and $-CH_2-CH_2-CN$.

6. The polymeric mixture according to claim 4 wherein $R_1$ is a hydrogen atom, a hydroxyalkyl or an alkyl group of from 1 to 12 carbon atoms.

7. The polymeric mixture according to claim 1 wherein an imidazolidine oligomer or a hexahydropyrimidine oligomer with a molecular weight of from about 400 to 1500 are present, which oligomers were obtained by addition of primary diamines with from 2 to 3 carbon atoms to alkanedioldiacrylates followed by cyclization with aldehydes or ketones of from about 1 to 9 carbon atoms.

8. The polymeric mixture according to claim 1 wherein the N,N'-substituted hexahydropyrimidine derivative has the general formula

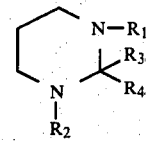

wherein $R_1$ is a hydrogen atom, a hydroxyalkyl group or an alkyl group of from 1 to 12 carbon atoms, $R_2$ an alkyl group with from 1 to 12 carbon atoms, or $R_1$ and $R_2$ are

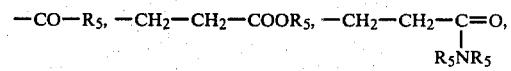

wherein $R_5$ is an alkyl group with from 1 to eight carbon atoms, and $-CH_2-CH_2-CN$, $R_3$ is a hydrogen atom or an alkyl group with from 1 to 5 carbon atoms and $R_4$ is a hydrogen atom or an alkyl group with from 1 to 5 carbon atoms or $R_3$ and $R_4$ together are a single alkylene group with from 4 to 6 carbon atoms.

9. The polymeric mixture according to claim 8 wherein $R_1$ and $R_2$ are

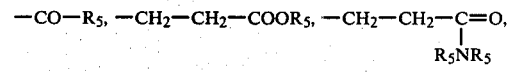

wherein $R_5$ is an alkyl group with up to eight carbon atoms, and $-CH_2-CH_2-CN$.

10. The polymeric mixture according to claim 8 wherein $R_1$ is a hydrogen atom, a hydroxyalkyl or an alkyl group with from 1 to 12 carbon atoms and $R_2$ is

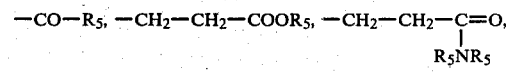

wherein $R_5$ is an alkyl group of from 1 to eight carbon atoms, and $-CH_2-CH_2-CN$.

11. The polymeric mixture according to claim 1 wherein the ratio of the mole equivalents of isocyanate to hardener ranges from 1:10 to 10:1.

12. The polymeric mixture according to claim 1 wherein the ratio of the mole equivalents of isocyanate to hardener ranges from 1:1.1 to 2.5:1.

13. Method for preparing a mixture capable of hardening with moisture comprising
adding organic polyisocyanates or polyepoxides to N,N'-substituted imidazolidine derivatives or to N,N'-substituted hexahydropyrimidine derivatives having at no N-atom a $-CO-NH-$ grouping, in the absence of moisture.

14. Method for preparing polyisocyanate polyaddition products or cross-linked polyepoxides in the presence of water comprising reacting organic polyisocyanates or polyepoxides with N,N'-substituted imidazolidine derivatives or with N,N'-substituted hexahydropyrimidine derivatives having at no nitrogen atom a $-CO-NH-$ grouping, under the hydrolyzing influence of water.

* * * * *